United States Patent Office 2,985,602
Patented May 23, 1961

2,985,602

WATER-BASE ALKYD RESIN PAINT USING LITHIUM HYDROXIDE DISPERSING AGENT

Ronald L. Broadhead, Park Forest, Ill., assignor to Standard Oil Company, Chicago, Ill., a corporation of Indiana No Drawing. Filed Sept. 5, 1958, Ser. No. 759,138

6 Claims. (Cl. 260—22)

This invention relates to paints comprising a dispersion of an alkyd resin in water.

The success of the rubber-base, i.e. so called latex water-base paints has spurred the paint industry into efforts to produce a competitive paint using an alkyd resin as the film-former. The water dispersion of alkyd resin is difficult to stabilize, particularly when pigments and organo-metallic driers are present.

An object of the invention is a water-base alkyd resin paint of good storage stability. Another object is a paint comprising a dispersion of an oil-modified alkyd resin and a pigment in water. Other objects will become apparent in the course of the description of the invention.

It has been discovered that water-insoluble alkyd resins, i.e. the polyesterification condensation reaction product of polyhydric alcohol and polycarboxyloic acid, which have an acid number between about 6 and about 25, can be dispersed in water to obtain a dispersion of good stability when lithium hydroxide is present in the dispersion. The lithium hydroxide must be present in an amount between about 50% and about 100% of that theoretically needed to neutralize the acidity of the resin. Dispersions of maximum stability are obtained when the usage of lithium hydroxide is on the order of, but not more than, 90% of the theoretical requirement.

The lithium hydroxide is particularly effective in producing stable dispersions when pigments such as titanium dioxide and organometallic driers such as lead naphthenate and cobalt naphthenate are present.

In general, stable dispersions of the defined alkyd resin are obtained in aqueous lithium hydroxide solutions when the resin is present in an amount between about 5 and about 40 weight percent based on resin and solution blended together.

The alkyd resins utilized as film-formers in the instant paint are water-insoluble polyesterification condensation reaction products of polyhydric alcohols and polycarboxylic acids. The alkyd resins may also be modified by the use of drying oils or fatty oils. The lithium hydroxide is particularly effective when the alkyd resin component is a medium or long-oil alkyd. In this connection, a medium oil length alkyd contains between about 40 and 60 percent of oil and a long-oil alkyd contains in excess of about 60% of oil. The polyhydric alcohols may be any one of the alcohols known to commerce for this reaction, for example, glycerol and glycol. The polycarboxylic acids may be the conventional phthalic acid or those now coming into use such as isophthalic and trimellitic. The fatty oils or acids used to modify the alkyd resin may be any of the vegetable oils, fatty oils, or fish oils commonly used in this area. Since the particular water-insoluble alkyd resin utilized in the paint of the instant invention may be any of those known to the art, detailed description thereof is not considered necessary. Numerous examples of commonly used materials are set out in Organic Coating Technology, volume 1 (1954), by H. F. Payne. Chapters 7 and 8 are directed to alkyd resins and their various modifications.

The lithium hydroxide stabilizer is effective in the presence or absence of pigments such as titanium dioxide or builders such as calcium carbonate. The lithium hydroxide stablizer is particularly useful when organo-metallic driers are present.

*Example*

In this example 15.0 grams of titanium dioxide pigment were mixed with 60 grams of a long-oil soya-phthalic type alkyd having an acid number of 8.2. This mixture was heated to 70° C. and added to a solution of 0.21 gram of lithium hydroxide in 134 milliliters of distilled water also at 70° C. with vigorous mechanical stirring. Emulsification was rapid and after 1 minute 1.0 gram of lead naphthenate solution containing 0.24 g. of lead and 0.5 gram of cobalt naphthenate containing 0.03 g. cobalt were added. The mixture then was stirred for 15 minutes to give a white paint suitable for coating wood or metal.

In another example, a dispersion was made up without using the titanium dioxide pigment. This dispersion was suitable for use as a varnish.

After six months storage in bottles, each of the above compositions remained as a fluid dispersion in the liquid composition. There was some settling of the pigment, as in an ordinary paint, but this pigment readily redispersed into the liquid. There was no evidence of gummy solid residue separating from the dispersion.

Similar compositions wherein potassium hydroxide and sodium hydroxide were substituted for the lithium hydroxide either did not form dispersions of any appreciable stability or the dispersion had an extremely short shelf life, in terms of a few days.

Thus having described the invention, what is claimed is:

1. A water-base alkyd resin paint consisting essentially of a water-insoluble alkyd resin polyesterification condensation reaction product of polyhydric alcohol and polycarboxylic acid, having an acid number between about 6 and about 25, dispersed in an aqueous lithium hydroxide solution, said paint containing, based on resin and solution blended together, between about 5 and 40 weight percent of said resin, lithium hydroxide in an amount between about 50% and about 100% of that theoretically needed to neutralize said resin.

2. The paint of claim 1 wherein said lithium hydroxide usage is not more than 90% of the theoretical requirement.

3. The paint of claim 1 wherein said resin is an oil-modified alkyd resin.

4. The paint of claim 3 wherein organo-metallic driers are present.

5. The paint of claim 4 wherein said driers are selected from the class of cobalt and lead naphthenates.

6. A water-dispersion paint consisting of about 64 weight percent of water, about 29 weight percent of a long-oil soya-phthalic alkyd resin having an acid number of about 8, about 7 weight percent of titanium dioxide pigment, lead naphthenate and cobalt naphthenate drier and lithium hydroxide in about 90% of the amount theoretically needed to neutralize said resin.

References Cited in the file of this patent

UNITED STATES PATENTS

| | | |
|---|---|---|
| 1,783,364 | Kienle et al. | Dec. 2, 1930 |
| 2,378,230 | Little | June 12, 1945 |
| 2,879,246 | Jackson | Mar. 24, 1959 |